United States Patent [19]
Kisor

[11] Patent Number: 5,964,832
[45] Date of Patent: Oct. 12, 1999

[54] USING NETWORKED REMOTE COMPUTERS TO EXECUTE COMPUTER PROCESSING TASKS AT A PREDETERMINED TIME

[75] Inventor: Gregory Hurst Kisor, Beaverton, Oreg.

[73] Assignee: Intel Corporation, Santa Clara, Calif.

[21] Appl. No.: 08/837,416

[22] Filed: Apr. 18, 1997

[51] Int. Cl.[6] .......................... G06F 15/173; G06F 15/00
[52] U.S. Cl. .................... 709/202; 709/203; 709/218; 709/219
[58] Field of Search ......................... 395/200.32, 200.33, 395/200.48, 200.49; 709/202, 203, 218, 219

[56] References Cited

U.S. PATENT DOCUMENTS

| 5,414,837 | 5/1995 | Kotatsu . |
|---|---|---|
| 5,710,918 | 1/1998 | Lagarde et al. . |
| 5,742,767 | 4/1998 | Honda . |
| 5,758,077 | 5/1998 | Danahy et al. . |
| 5,758,083 | 5/1998 | Singh et al. . |
| 5,761,507 | 6/1998 | Govett . |
| 5,774,668 | 6/1998 | Choquier et al. . |
| 5,790,789 | 8/1998 | Suarez . |
| 5,793,964 | 8/1998 | Rogers et al. . |
| 5,805,884 | 9/1998 | Sitbon et al. . |

*Primary Examiner*—Krisna Lim
*Attorney, Agent, or Firm*—Kenyon & Kenyon

[57] ABSTRACT

A system executes computer processing tasks on a remote computer that communicates with a central computer. The remote computer receives a start message from the central computer. Based on the start message, the remote computer processes raw data to generate processed data, and stores the processed data. Finally, the remote computer sends a complete message to the central computer.

29 Claims, 2 Drawing Sheets

USING NETWORKED REMOTE COMPUTERS TO EXECUTE COMPUTER PROCESSING TASKS AT A PREDETERMINED TIME

BACKGROUND OF THE INVENTION

The present invention is directed to a system for executing computer processing tasks. More particularly, the present invention is directed to a system that uses networked remote computers to execute computer processing tasks received from a central computer.

In recent years computer networks, and especially wide area networks ("WAN"), have become an important part of the day to day lives of many computer owners. Every day millions of users connect to the most well known WAN, the Internet, which is a Transmission Control Protocol/Internet Protocol ("TCP/IP") based network. Nearly every personal computer ("PC") user having a modem and a telephone line can access the Internet for little cost through commercial companies that provide a gateway to the Internet. Internet services include E-mail, database access, and news groups. The Internet also acts as a service medium for many companies trying to market products.

Many of the personal computers which are connected to WANs are high powered personal computers which may contain microprocessors, such as the Intel Pentium® or Pentium® Pro microprocessor. These personal computers may also include RAM memory, a display unit, long-term storage such as a hard disk drive, and other proprietary processors such as video graphic cards and math co-processors. These independent, stand-alone computers are idle for a significant portion of the day. For example, a personal computer owned at home may be idle or even off while the owner is away at work. The computer may also be idle at night while the owner is asleep. Personal computers at the office may only be utilized from 9 A.M. in the morning till 5 P.M. in the evening. At any particular time, peak usage in one part of the world can be offset by low usage in a different part of the world. For example, periods of high computer usage in New York City may be night time in Tokyo when idle personal computers are readily available. It would be advantageous to find a way of utilizing this wasted computer resource.

As WANs, such as the Internet, become more popular, the demand on the computational power of the computers which provide WAN services keeps increasing. Computers, including servers, must perform many tasks including the providing and generating of WEB pages, compressing Moving Pictures Expert Group ("MPEG") and Joint Photographic Expert Group ("JPEG") images, and serving up WEB pages. These task and the exploding number of users place increasing demands on the computers at WAN service providers and Internet WEB sites. Service providers, such as American Online™ ("AOL") and Compuserve increasingly must buy more powerful computers to service the additional members and the new content that is constantly being updated. These service providers could save on computer costs if some of the computational requirements of their system could be serviced by remote personal computers owned by private individuals and other independent entities who subscribe to the Internet provider services.

Based on the foregoing, there is a need for a system that uses networked remote computers to execute computer processing tasks received from a central computer so that the otherwise idle remote computers can be utilized.

SUMMARY OF THE INVENTION

The present invention is a system for executing computer processing tasks on a remote computer that communicates with a central computer. The remote computer receives a start message from the central computer. Based on the start message the remote computer, processes raw data to generate processed data, and stores the processed data. Finally, the remote computer sends a complete message to the central computer.

DETAILED DESCRIPTION

The present invention is related to the invention disclosed in U.S. application Ser. No. 08/777,024 entitled "Management Of Network Resources" by Greg Kisor, filed on Dec. 30, 1996 (the "'024 application"), the disclosure of which is hereby incorporated by reference. The '024 application discloses a system in which a central computer, executing a management program, distributes and coordinates tasks executed by a plurality of independent remote computers.

One embodiment of the present invention is a system for executing computer processing tasks. The system includes a remote computer that executes tasks received from a central computer. In one embodiment of the present invention, the tasks are received from the central computer disclosed in the '024 application.

Figure 1:
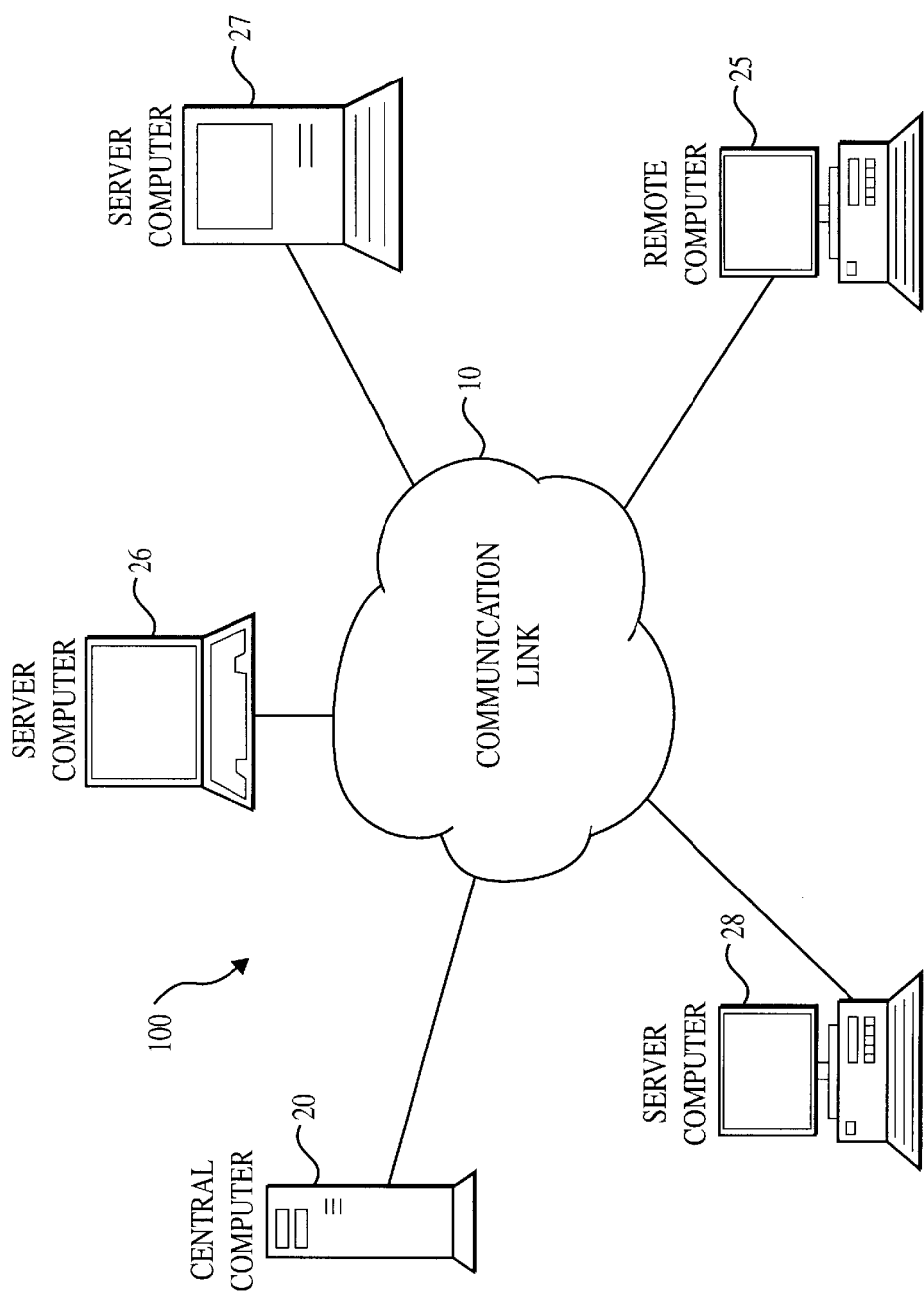
FIG. 1 is an illustration of a computer network in accordance with one embodiment of the present invention.

FIG. 1 is an illustration of a computer network 100 in accordance with one embodiment of the present invention. Computer network 100 includes a central computer 20, a remote computer 25, and a plurality of server computers 26–28. All of the computers in FIG. 1 are coupled together, either directly or indirectly, via a communication link 10. Each of the computers shown in FIG. 1 include a microprocessor and execute an operating system, and the computers operate independently of each other. Further, although not required by the present invention, each computer shown in FIG. 1 includes a storage device.

In one embodiment, communication link 10 is the Internet, and the computers are coupled to communication link 10 using well known techniques (e.g., via telephone lines using modems, via local area networks, etc.). In other embodiments of the present invention, communication link 10 is any device that allows the computers to communicate with each other. For example, communication link 10 can be a local area network, an Intranet, dedicated communication lines, etc. Further, communication link 10 might be a different link for different pairs of computers. For example, central computer 20 might communicate to remote computer 25 via the Internet, and remote computer 25 might communicate to server computer 28 via a local area network.

In one embodiment of the present invention, central computer 20 is similar to the central computer disclosed in the '024 application. In this embodiment, central computer 20 sends an assigned task, or "starts" message to remote computer 25 when it determines that computer 25 is capable of executing a task.

Figure 2:
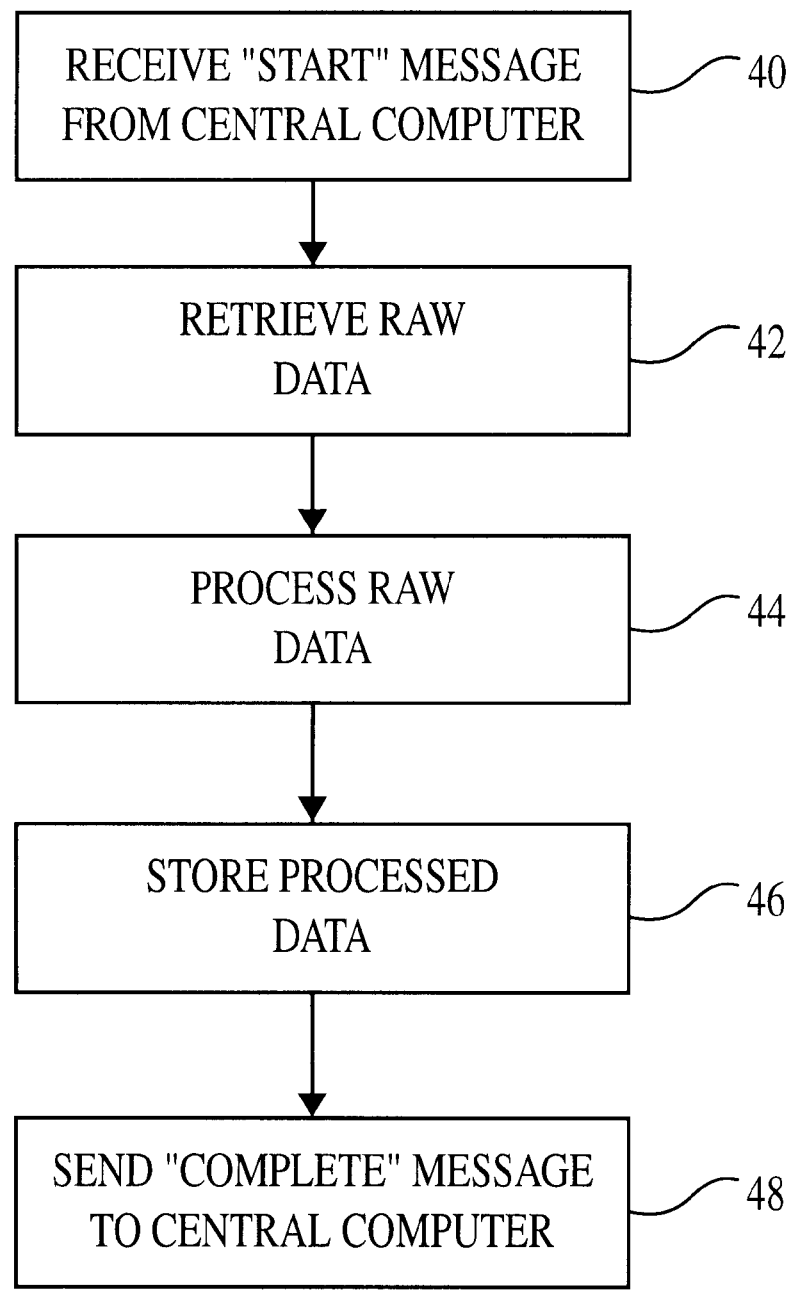
FIG. 2 is a flowchart of the steps performed by a remote computer when it receives a start message from a central computer.

FIG. 2 is a flowchart of the steps performed by remote computer 25 when it receives a start message from central computer 20. In one embodiment, the functionality of the steps is included in a task processing program that is stored on, and executed by, remote computer 25.

At step 40, remote computer 25 receives a start message from central computer 20. The start message indicates the nature of the task required and, if necessary for the processing, the location of raw data to be processed. Typical examples of tasks required include MPEG compression, JPEG compression, acting as a HyperText transfer protocol ("HTTP") server serving Internet Web pages, and storing information on a storage device. The raw data can be located anywhere on network 100 that is accessible by remote computer 25. For example, the raw data can be located on a storage device of remote computer 25, servers 26–28, or central computer 20. In the alternative, the raw data can be sent directly to the remote computer as part of the start message.

At step 42, remote computer 25 retrieves the raw data. If the raw data is part of the start message, the raw data is retrieved as soon as the start message is received. Otherwise, the raw data is retrieved from the location indicated by the start message.

At step 44, remote computer 25 processes the raw data by executing the task indicated in the start message. Then, at step 46, remote computer 25 stores the processed data in any location on network 100 that is accessible by central computer 20. For example, the raw data can be located on the storage device of remote computer 25, servers 26–28, or central computer 20.

Finally, at step 48, remote computer 25 sends central computer 20 a "complete" message. The complete message informs central computer 20 that the task has been executed and provides the storage location of the processed data. In the alternative, the processed data can be sent directly to the central computer as part of the complete message.

As described, a remote computer executes computer processing tasks received from a central computer. This allows the central computer to offload tasks to remote computers that have available capacity and would otherwise be idle.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, one embodiment described includes a single remote computer. However, other embodiments include a plurality of remote computers, each of which executes the steps shown in FIG. 2.

What is claimed is:

1. A method of utilizing the excess processing capacity of a remote computer coupled over a communications network to a central computer, the central computer having a first set of processing tasks, the remote computer having a second set of processing tasks that the remote computer performs only during predetermined times, and said remote computer being otherwise available for processing, said method comprising:

(a) receiving a start message at the remote computer from the central computer at a time that the central computer has predetermined the remote computer will be available for processing one of said first set of processing tasks;
    (b) processing raw data related to said first set of processing tasks to generate processed data;
    (c) storing the processed data; and
    (d) sending a complete message to the central computer.

2. The method of claim 1, wherein the remote computer communicates with the central computer over a Transmission Control Protocol/Internet Protocol based network.

3. The method of claim 1, wherein the remote computer communicates with the central computer over a local area network.

4. The method of claim 1, wherein the start message comprises a task and a storage location of the raw data, further comprising the step of retrieving the raw data.

5. The method of claim 1, wherein the start message comprises a task and the raw data, and the raw data is processed in accordance with the task.

6. The method of claim 1, wherein the complete message comprises a storage location of the processed data.

7. The method of claim 1, wherein the complete message comprises the processed data.

8. The method of claim 1, wherein a plurality of server computers communicate with the remote computer and the central computer, further comprising the step of retrieving the raw data from one of the plurality of server computers.

9. The method of claim 1, wherein a plurality of server computers communicate with the remote computer and the central computer, step (c) comprising the step of:

(c-1) storing the processed data on one of the plurality of server computers.

10. A system for utilizing the excess processing capacity of a remote computer coupled over a communications network to a central computer comprising:

a communications link;
    a plurality of computers coupled to said communications link in communication with each other, said plurality of computers comprising a central computer having a first set of processing tasks, and at least one remote computer, said remote computer required to perform a second set of tasks only during predetermined times, said remote computer being otherwise available for processing;
    a management program executing on said central computer, said management program sending via said communication link a start message to said at least one remote computer to start a task selected from said first set of tasks at a predetermined time that said remote computer is available;
    a task processing program that executes on said at least one remote computer, said task processing program, in response to said start message processing raw data to generate processed data, storing said processed data, and sending via said communications link a complete message to said central computer.

11. The system of claim 10, wherein said communications link is a Transmission Control Protocol/Internet Protocol based network.

12. The system of claim 10, wherein said communications link is a local area network.

13. The system of claim 10, said plurality of computers further comprising at least one server computer.

14. The system of claim 13, wherein said task processing program stores said processed data on said at least one remote computer.

15. The system of claim 13, wherein said task processing program stores said processed data on said at least one server computer.

16. A remote computer having a first set of processing tasks that the remote computer is required to perform only during predetermined times, the remote computer being otherwise available for processing, wherein the remote computer communicates with a central computer having a second set of processing tasks, the remote computer programmed to perform the following steps:

(a) receiving a start message from the central computer at a time that the central computer has predetermined the remote computer will be available for processing;

(b) processing raw data related to a task selected from the second set of processing tasks to generate processed data;

(c) storing the processed data; and (d) sending a complete message to the central computer.

17. The remote computer of claim 16, wherein the remote computer communicates with the central computer over a Transmission Control Protocol/Internet Protocol based network.

18. The remote computer of claim 16, wherein the remote computer communicates with the central computer over a local area network.

19. The remote computer of claim 16, wherein a plurality of server computers communicate with the remote computer and the central computer, further comprising the step of retrieving the raw data from one of the plurality of server computers.

20. The remote computer of claim 16, wherein a plurality of server computers communicate with the remote computer and the central computer, step (c) comprising the step of:

(c-1) storing the processed data on one of the plurality of server computers.

21. A method of utilizing the excess processing capacity of a remote computer that is required to perform a first set of processing tasks only during predetermined times, wherein the remote computer communicates with a central computer having a second set of processing tasks, said method comprising:

(a) determining a time at which the remote computer will be available for processing a task selected from the second set of processing tasks;

(b) receiving a start message from the central computer at said time;

(c) processing raw data related to the task to generate processed data;

(d) storing the processed data; and (e) sending a complete message to the central computer.

22. The method of claim 21, wherein the remote computer communicates with the central computer over a Transmission Control Protocol/Internet Protocol based network.

23. The method of claim 21, wherein the remote computer communicates with the central computer over a local area network.

24. The method of claim 21, wherein the start message comprises a task and a storage location of the raw data, further comprising the step of retrieving the raw data.

25. The method of claim 21, wherein the start message comprises a task and the raw data, and the raw data is processed in accordance with the task.

26. The method of claim 21, wherein the complete message comprises a storage location of the processed data.

27. The method of claim 21, wherein the complete message comprises the processed data.

28. The method of claim 21, wherein a plurality of server computers communicate with the remote computer and the central computer, further comprising the step of retrieving the raw data from one of the plurality of server computers.

29. The method of claim 21, wherein a plurality of server computers communicate with the remote computer and the central computer, step (d) comprising the step of:

(d-1) storing the processed data on one of the plurality of server computers.

* * * * *